(12) United States Patent
Jain et al.

(10) Patent No.: US 7,647,281 B2
(45) Date of Patent: Jan. 12, 2010

(54) SYSTEMS AND METHODS FOR MODELING APPROXIMATE MARKET EQUILIBRIA

(75) Inventors: Kamal Jain, Bellevue, WA (US); Mohammad Mahdian, Cambridge, MA (US); Amin Saberi, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 10/782,687

(22) Filed: Feb. 19, 2004

(65) Prior Publication Data

US 2005/0187803 A1 Aug. 25, 2005

(51) Int. Cl.
*G06F 17/00* (2006.01)
(52) U.S. Cl. ...................................... 705/400
(58) Field of Classification Search .................. 705/400
See application file for complete search history.

(56) References Cited

U.S. PATENT DOCUMENTS

2004/0111308 A1* 6/2004 Yakov ............................ 705/8

OTHER PUBLICATIONS

Devanur, Nikhil R., Papadimitriou, Christos H., Saberi, Amin, and Vazirani, Vijay V., "Market Equilibrium Via a Primal-Dual-Type Algorithm," focs, pp. 389, The 43rd Annual IEEE Symposium on Foundations of Computer Science (FOCS'02), 2002.*

Joan Feigenbaum, et al., Computation in a Distributed Information Market, EC'03, 2003, pp. 156-165, San Diego, California, USA.
Kamul Jain, et al., Approximating Market Equilibria, Microsoft Research, 2003, 11 pages.
Wei Yang, et al., Risk Management in Natural Gas Supply Chain, AAMAS'02, 2002, pp. 1033-1034, Bologna, Italy.
Sanjay Jain, et al., Development of a High-Level Supply Chain Simulation Model, Proceedings of the 2001, Winter Simulation Conference, 2001, pp. 1129-1137.
Michael H. Schneider, The Expanding Equilibrium Algorithm, ACM Transactions on Mathematical Software, 1987, pp. 382-398, vol. 13-No. 4.
Robert E. Shannon, Simulation Modeling and Methodology, Winter Simulation Conference, 1976, pp. 9-15.

* cited by examiner

*Primary Examiner*—John W Hayes
*Assistant Examiner*—Nathan Erb
(74) *Attorney, Agent, or Firm*—Lee & Hayes, PLLC

(57) ABSTRACT

The present invention leverages demarcation of an agent into both a demander and a supplier to provide a polynomial-time method of approximating a supply and demand system's equilibrium value. This provides, in one instance of the present invention, a simplified means to iteratively extract the equilibrium value. By providing demarcated data, the present invention accounts for both demand and supply effects of an agent within a modeled supply and demand system. In one instance of the present invention, a market equilibrium price vector is approximated by employing a revenue value generated for an agent in a current market equilibrium price iteration as a budget value for the agent in the next iteration. This permits market equilibrium value modeling that encompasses an agent's contributions to a market both as a buyer and a seller within the same market for a given good and/or service.

14 Claims, 10 Drawing Sheets

SYSTEMS AND METHODS FOR MODELING APPROXIMATE MARKET EQUILIBRIA

TECHNICAL FIELD

The present invention relates generally to computer modeling, and more particularly to systems and methods for modeling approximate equilibrium values for supply and demand systems.

BACKGROUND OF THE INVENTION

Since the beginning of time, people have desired to obtain items that they did not possess. Often, to accomplish this, they gave something in return in order to obtain what they wanted. Thus, in effect, they were creating a "market" where goods and/or services could be traded. The trading for a particular good usually lasted until everyone who wanted that good obtained one. But, as is often the case, if the one who was supplying the good demanded more in return than what another wanted to give up, that other person left the market without that good. In spite of not getting that particular good, the person, however, was still satisfied because they felt that what they did have was better than the good they did not obtain. This is generally known as "buyer satisfaction." In other words, buyers enter a marketplace and buy the items they need until the price of a particular item is more than they deem worthy for their own satisfaction. Satisfying a person tends to be a very individual trait; however, over a large number of people involved in a large market, the extreme differences settle out, leaving a general value or "price" of a good for that particular market. If the market price is too low, everyone will demand to have one, quickly depleting the supply of the good. However, if the price of the good is too high, the supply will remain high, with no trades taking place. Ideally, it is most desirable to have the supply equal the demand. Thus, as soon as a good is ready for market, it is quickly sold to someone who needs it. In this manner, a market is considered to be operating "efficiently" due to the supply equaling the demand. All buyers who desire a good at the market price are satisfied, while all sellers have sold their supplies, maximizing sales of their goods. This optimum market price, where supply equals demand, is known as a "market equilibrium price."

Because the market equilibrium price affords great benefits to both sellers and buyers in a market, it is very desirable to ascertain this price, especially for new goods entering a marketplace. A new supplier does not want to manufacture a high volume of goods if its manufacturing costs generate a product price that is too high to move the amount of goods. Likewise, if the new supplier attempts to sell below the market equilibrium price, the supplier will quickly run out of goods because the demand will far exceed the supply. Again, ideally, the supplier wants to produce the right number of goods at the market equilibrium price. Thus, the market equilibrium price becomes a very powerful business tool, foretelling product success or failure in the marketplace. For this reason, great efforts have been made to determine a market equilibrium price for a given good in a given market. Despite these efforts, it is still very difficult to produce a viable market equilibrium price. The amount of variables/factors involved with determining/defining a market are not inconsequential. Market data, such as number of buyers, number of sellers, value to a buyer, production costs, and even weather, play an important role in pricing of goods. Thus, market parameters must be modeled adequately to foretell a market equilibrium price.

Accordingly, the behavior of a complex marketplace with multiple goods, buyers, and sellers, can only be understood by analyzing the system in its entirety. In practice, such markets tend toward a delicate balance of supply and demand as determined by the agents' fortunes and utilities. The study of this equilibrium situation is known as general equilibrium theory and was first formulated by Léon Walras in 1874 (see, *Éléments d'économie politique pure; ou, Théorie de la richesse sociale* (*Elements of Pure Economics, or the theory of social wealth*); Lausanne, Paris, 1874 (1899, 4$^{th}$ ed.; 1926, rev. ed., 1954, Engl. transl.)). In the Walrasian model, the market consists of a set of agents, each with an initial endowment of goods, and a function describing the utility each one will derive from any allocation. The initial allocation could be sub-optimal, and the task of exchanging goods to mutually increase the utilities might be fairly complicated. A functioning market accomplishes this exchange by determining appropriate prices for the goods. Given these prices, all agents independently maximize their own utility by selling their endowments and buying the best bundle of goods they can afford. This new allocation will be an equilibrium allocation if the total demand for every good equals its supply. The prices that induce this equilibrium are called the market-clearing prices (or market equilibrium price), and the equilibrium itself is called a market equilibrium.

Despite the better understanding of how a marketplace functions, modeling such a marketplace has proven extremely difficult. An agent is often both a buyer and a seller of goods. Satisfaction of a buyer can change dependent on many factors including how the buyer is doing as a seller (e.g., were enough goods sold so that the agent could function as a buyer of a good, etc.). Many variables that may seem trivial at first can have profound impact on a marketplace. Theoretical constructs that attempt to provide a basis for modeling the marketplace tend to be extremely complex for these reasons. The complexity often reaches a point where the basis for the model cannot even be resolved with today's fastest computers. Thus, even with the great technological advances in this century, the Walrasian model described in 1874 still cannot be effectively modeled. This leaves society without a means to maximize their markets, resulting in waste of not only manufactured goods, but also a waste of natural resources utilized in products brought to market. Thus, inefficient markets actually cause an increase in overall prices for goods and services.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to computer modeling, and more particularly to systems and methods for modeling approximate equilibrium values for supply and demand systems. Demarcation of an agent into both a demander and a supplier is leveraged to provide a polynomial-time method of approximating a supply and demand system's equilibrium value. This provides, in one instance of the present invention, a simplified means to iteratively extract the equilibrium value. By providing demarcated data, the present invention accounts for both demand and supply effects of an agent within a modeled supply and demand system. In one instance of the present invention, a market equilibrium price vector is approximated by employing a revenue value generated for an agent in a current market equilibrium price iteration as a budget value for the agent in the next iteration. This permits market equilibrium value modeling that encompasses an agent's contributions to a market, both as a buyer and a seller within the same market for a given good and/or service. Thus, the present invention more accurately and precisely models an actual market within a polynomial-time constraint.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
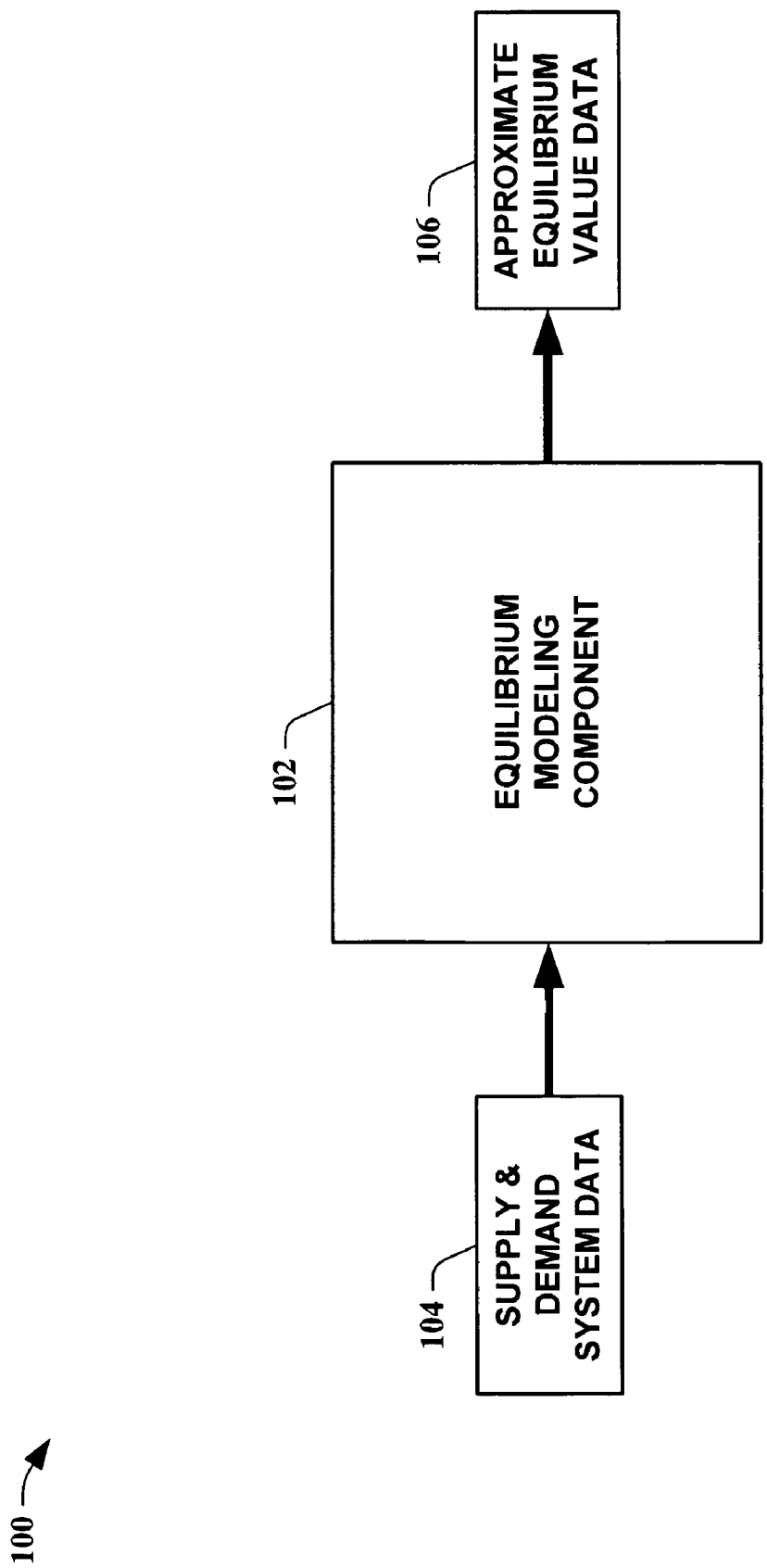
FIG. 1 is a block diagram of an equilibrium modeling system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides systems and methods that allow a system's equilibrium state to be determined in a polynomial-time manner. This permits evaluations of systems such as markets to determine effects such as, for example, price increases on the demand of such entities as goods and services and the like. In one instance of the present invention, a linear utility function is utilized in a polynomial-time method to determine a market equilibrium price vector for a market system. The value of the present invention is unlimited in the sense that it can approximate impacts of changing variables within a system, even a global system, to facilitate in maximizing both seller and buyer benefits in the market system. This allows, for example, only the correct amount of goods to be produced for a particular good at a particular price within the system. Thus, resources, such as natural and manmade resources, can be utilized to maximum benefit instead of by producing goods that will remain unsold. The present invention also provides a powerful analytical tool to aid in research and development for new goods and economic solutions, even politically sanctioned tariffs and the like can be accounted for by utilizing the invention. This facilitates immensely in determining pricing strategies and the like.

In FIG. 1, a block diagram of an equilibrium modeling system 100 in accordance with an aspect of the present invention is shown. The equilibrium modeling system 100 is comprised of an equilibrium modeling component 102. The equilibrium modeling component 102 receives supply and demand system data 104 and outputs approximate equilibrium value data 106. The approximate equilibrium value data 106 is determined by utilizing, in this instance of the present invention, a polynomial-time method with a linear utility function to assess the supply and demand system data 104. The equilibrium modeling component 102 generally demarcates at least a portion of the supply and demand system data 104 into supply system data and demand system data to be utilized within the polynomial-time method. By processing the supply and demand system data 104 iteratively, in one example of the present invention, a budget of an agent within a current iteration can utilize revenue generated by the agent from a previous iteration. A dummy buyer can also be employed to purchase residual goods in order to facilitate initializing the present invention. The polynomial-time method is discussed in more detail infra.

Figure 2:
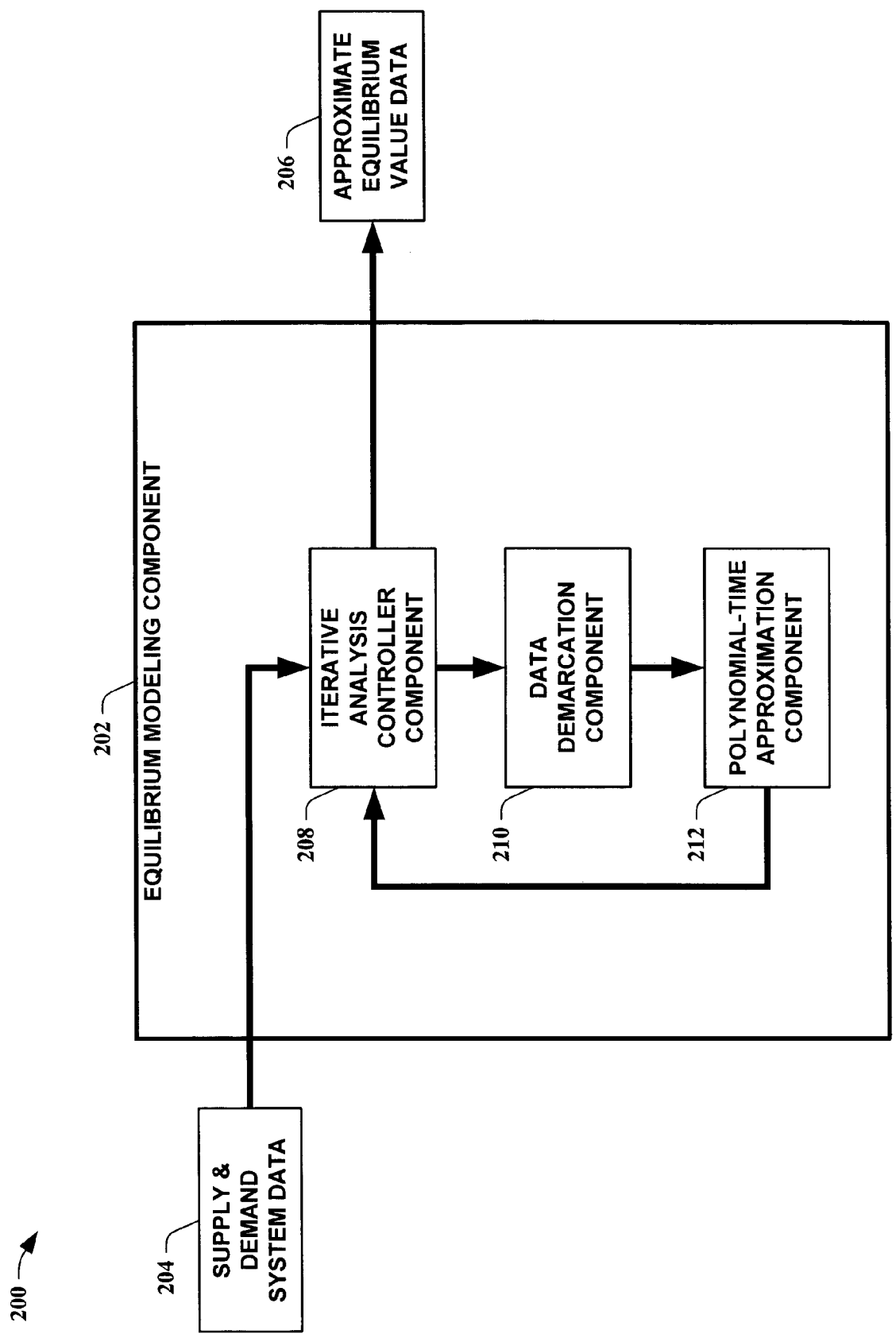
FIG. 2 is another block diagram of an equilibrium modeling system in accordance with an aspect of the present invention.

Referring to FIG. 2, another block diagram of an equilibrium modeling system 200 in accordance with an aspect of the present invention is depicted. The equilibrium modeling system 200 is comprised of an equilibrium modeling component 202. The equilibrium modeling component 202 receives supply and demand system data 204 and outputs approximate equilibrium value data 206. The equilibrium modeling component 202 is comprised of an iterative analysis controller component 208, a data demarcation component 210, and a polynomial-time approximation component 212. The iterative analysis controller component 208 provides control for an iterative modeling process and outputs the approximate equilibrium value data 206 at an appropriate point. The iterative analysis controller component 208 initiates the equilibrium modeling component 202 and halts the component 202 when appropriate, either in a predetermined manner and/or dynamic manner. The determination to output the approximate equilibrium value data 206 can be based on, for example, number of iterations, a predetermined threshold error value, and/or a dynamic control process, and the like. The iterative analysis controller component 208 receives the supply and demand system data 204 and outputs supply data and demand data to the data demarcation component 210. The data demarcation component 210 constructs a dichotomous system for supply and demand. Agents of a system are utilized both as suppliers and demanders by the data demarcation component 210. The component 210 utilizes values from data generated from previous iterations to determine values of data to be sent to the polynomial-time approximation component 212. This permits, for example, revenue generated by an agent as a supplier in a previous iteration to be utilized as a budget for the agent as a buyer in a current iteration. The component 210 can also provide a "dummy" agent to facilitate in initializing the polynomial-time approximation component 212. The polynomial-time approximation component 212 processes the data from the data demarcation component 210 utilizing a linear utility function for agents of the system being modeled. Methods utilized by the polynomial-time approximation component 212 are discussed in detail infra. Results from the processing are sent to the iterative analysis controller component 208 to determine if the results are sufficient or not to halt the equilibrium modeling component 202 and output the approximate equilibrium value data 206. In this manner, the present invention provides an approximate equilibrium value within polynomial-time.

One skilled in the art can appreciate that various systems can be modeled by the equilibrium modeling component 202. These systems can include, but are not limited to, market systems and computer network traffic systems and the like. Supply and demand features of a system can be exploited by the present invention to provide an approximate equilibrium value that can be utilized to optimize a system.

In order to better appreciate the context of the present invention, consider the problem of finding the market equilibrium prices under linear utility functions. A notion of approximate market equilibrium was proposed by Deng, Papadimitriou and Safra (see, Xiaotie Deng, Christos Papadimitriou, and Shmuel Safra; On The Complexity Of Equilibria; In *Proceedings of ACM Symposium on Theory of Computing*, 2002). Expounding upon this notion, the present invention provides the first fully polynomial-time approximation scheme for finding a market equilibrium price vector. One instance of the present invention employs, in part, a polynomial-time algorithm of Devanur et al. (see, Nikhil R. Devanur, Christos H. Papadimitriou, Amin Saberi, and Vijay V. Vazirani; Market Equilibrium Via A Primal-Dual-Type Algorithm; In *The 43rd Annual IEEE Symposium on Foundations of Computer Science*, 2002; for a variant of the problem in which there is a clear demarcation between buyers and sellers).

Much work has been devoted to establishing the existence of market equilibria (see, K. Arrow and G. Debreu; Existence Of An Equilibrium For A Competitive Economy; *Econometrica,* 22:265-290, 1954 and A. Wald; On some systems of equations of mathematical economics; *Zeitschrift für Nationalökonomie,* Vol. 7, 1936. Translated, 1951, Econometrica 19(4), pp. 368-403). This difficult problem is typically approached by placing different assumptions on the endowment and utility functions of the agents. The seminal work of Arrow and Debreu proves the existence of market equilibria in the quite general setting of concave utility functions by applying Kakutani's fixed point theorem. This generality comes at a high price: the proof is non-constructive and so does not give an algorithm to compute the equilibrium prices. Yet computing these prices can be of considerable importance for predicting the market. For example, in order to determine the effects of a change in a tariff, the equilibrium prices must be able to be computed before and after the tariff change. Equilibrium prices also have applications in computer science. Kelly and Vazirani (see, F. P. Kelly and V. V. Vazirani; Rate Control As A Market Equilibrium) show that the rate control for elastic traffic in a network can be reduced to a market equilibrium problem. Despite the impressive progress in computing equilibrium prices (see, K. J. Arrow, H. D. Block, and L. Hurwicz; On The Stability Of Competitive Equilibrium II; *Econometrica,* 27:82-109, 1959; K. J. Arrow and L. Hurwicz; On The Stability Of Competitive Equilibrium I; *Econometrica,* 26:522-52, 1958; W. C. Brainard and H. E. Scarf; How To Compute Equilibrium Prices In 1891; *Cowles Foundation Discussion Paper* 1270, 2000; and H. Scarf; The Computation of Economic Equilibria (*with collaboration of T. Hansen*); Cowles Foundation Monograph No. 24, New Haven: Yale University Press, 1973), especially the seminal work of Scarf, polynomial-time methods have evaded researchers. In the special case of linear utility functions, Deng, Papadimitriou, and Safra (see also, Christos H. Papadimitriou; Algorithms, Games, And The Internet; In *Proceedings of ACM Symposium on Theory of Computing,* 2001) provide a polynomial-time algorithm when the number of goods or agents is bounded. Devanur et al. obtain a polynomial-time algorithm via a primal-dual-type approach when there is a demarcation between sellers and buyers. However, the question of existence of a polynomial-time algorithm for the general case was unsolved. The present invention provides the first fully polynomial-time approximation scheme for this problem. Since the market equilibrium problem is not an optimization problem, it needs to be clarified as to what an approximate market equilibrium entails. A definition is utilized as proposed by Deng, Papadimitriou, and Safra. According to this definition, an approximate market equilibrium is a price vector for which there is an allocation of goods to agents of a market that approximately clears the market, and each agent is approximately, maximally-happy with the allocation (subject to their budget constraint). A precise definition is presented infra.

In a general market equilibrium problem, all agents are buyers as well as sellers. However, the algorithm of Devanur et al. works only when the buyers and sellers are different. The reason is that their algorithm requires that the buyers' budgets be known beforehand. The present invention overcomes the limitations of Devanur et al., in part, by running in iterations and letting the budget of an agent in a current iteration be revenue the agent generated in a previous iteration. Another limitation of the algorithm of Devanur et al. is that it requires an initial setting of prices in which no good is undersold. The present invention overcomes this limitation as well by adding a dummy buyer who has enough money to buy the residual goods.

As an illustration of the present invention, consider a market consisting of n agents trading m types of divisible goods. Initially, each agent i has an endowment $w^i \in \mathbb{R}^m$ of goods (i.e., $w^i_j$ indicates the amount of good j that agent i initially has). Assume, without loss of generality, that in total there is one unit of each type of good in the initial endowments (i.e., $$\sum_{i=1}^{n} w_j^i = 1$$

for every good j). Also, each agent i has a utility function $u_i$: $\mathbb{R}^m \mapsto \mathbb{R}^+$. That is, if $x \in \mathbb{R}^m$ is a vector that specifies how much of each good agent i has, then $u_i(x)$ indicates the utility (or happiness) of agent i. If a price of $p_{j*}$ dollars is set for one unit of good j, then agent i can sell its endowment for a total of $$\sum_{j=1}^{m} p_j^* w_j^i$$

dollars. Utilizing this money, the agent can buy a bundle $x \in \mathbb{R}^m$ of goods. Since each agent is trying to maximize its utility, the bundle x is a solution to the following maximization equation:

$$\text{maximize} \quad u_i(x) \quad \text{(Eq. 1)}$$
$$\text{subject to} \quad \sum_{j=1}^{m} p_j^* x_j \le \sum_{j=1}^{m} p_j^* w_j^i.$$

Such a solution x is called an optimal bundle for agent i. If the function $u_i$ is strictly concave (i.e., for every $x \ne x' \in \mathbb{R}^m$, $u_i((x+x')/2) > (u_i(x) + u_i(x'))/2$), then there is a unique optimal bundle for agent i. The Arrow-Debreu theorem states the following:

Theorem A: (Arrow and Debreu) Consider the above setting and assume that $u_i$'s are strictly concave. Then there is a price vector $p^*$ such that if each agent buys the optimal bundle with respect to $p^*$, then the market clears. In other words, if $x^i \in \mathbb{R}^m$ is the optimal bundle for agent i with respect to $p^*$, then for every good j, $$\sum_{i=1}^{n} x_j^i = \sum_{i=1}^{n} w_j^i.$$

If the utility functions are concave but not strictly concave (e.g., if they are linear), then the optimal bundle is not necessarily unique. In this case, the Arrow-Debreu theorem says that there is a price vector $p^*$ and a bundle $x^i$ for each agent i, such that $x^i$ is an optimal bundle for i with respect to $p^*$, and if for every i, agent i buys the bundle $x^i$, then the market clears.

The proof of the Arrow-Debreu theorem is existential and utilizes a fixed point theorem. Therefore, a natural question is whether one can efficiently compute the equilibrium prices that are guaranteed to exist by the Arrow-Debreu theorem. The present invention can be utilized in formulating a representative model which utilizes this theorem.

Devanur et al. present a polynomial-time algorithm that computes the market-clearing prices in a market with the following conditions:

1. All utility functions are linear, i.e., $$u_i(x) = \sum_{j=1}^{m} u_{ij} x_j$$

for non-negative constants $u_{ij}$.

2. There is a distinction between buyers and sellers in the market. More precisely, there are m sellers, each having one unit of a different type of good, and n buyers in the market. Each buyer i has a given budget $e_i$, and wants to buy a certain amount of each good to maximize the buyer's utility, subject to the buyer's budget constraint. A market with this property is denoted as a dichotomous market.

The algorithm of Devanur et al. is referred to as the DPSV algorithm. The idea of the DPSV algorithm is to start from a price vector $p^0$ satisfying an invariant stated below and keep increasing the prices subject to not violating the invariant, until the equilibrium prices converge. In order to introduce the invariant, the concept of the equality subgraph is first defined.

Figure 3:
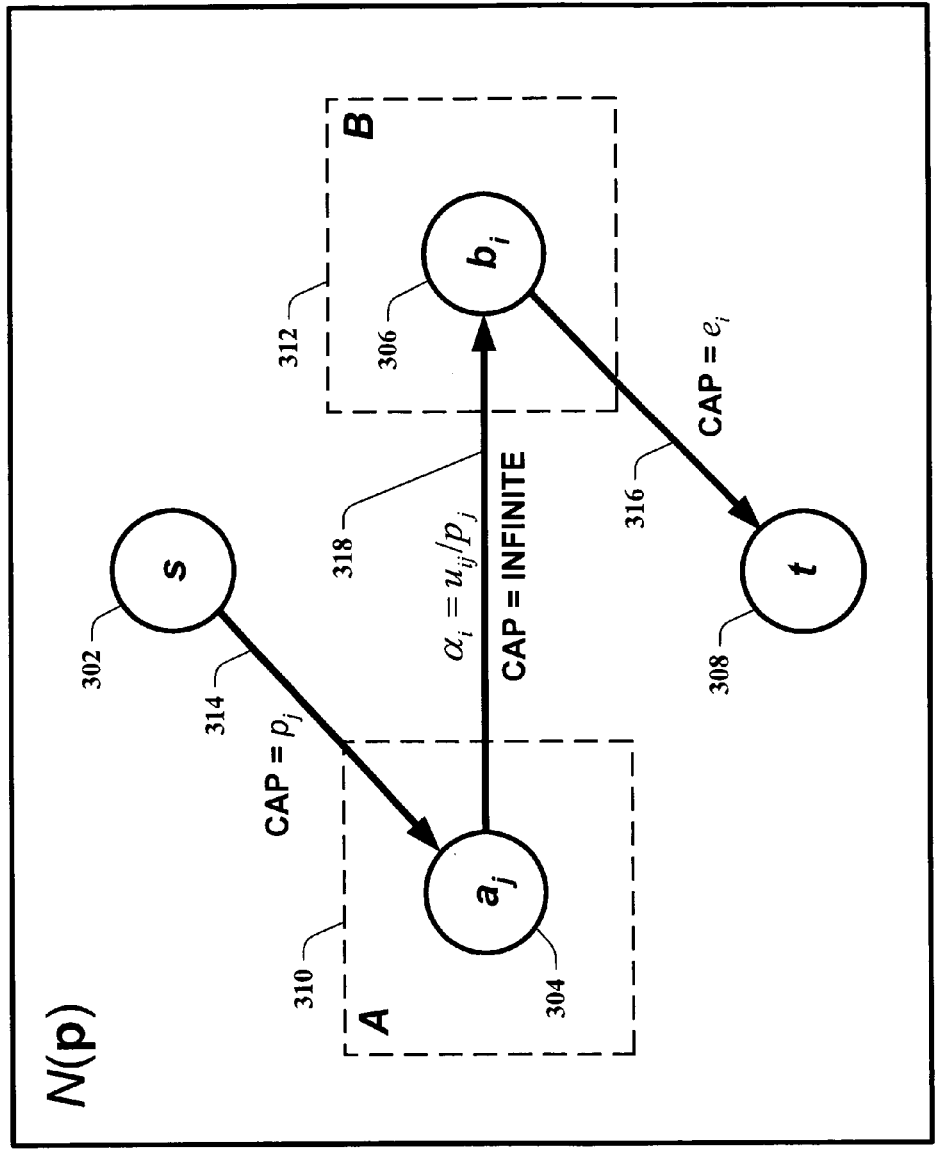
FIG. 3 is a graph illustrating a dichotomous market equality subgraph in accordance with an aspect of the present invention.

In FIG. 3, a graph illustrating a dichotomous market equality subgraph 300 in accordance with an aspect of the present invention is shown. Let p be a price vector. For each agent i, let $\alpha_i = \max_j \{u_{ij}/p_j\}$ ($\alpha_i$ is agent i's bang per buck). The equality subgraph N(p) 300 is a network whose vertex set consists of a source s 302, a vertex $a_j$ for each good j 304, a vertex $b_i$ for each buyer i 306, and a sink t 308. Let A 310 and B 312 denote the sets of $a_j$'s and $b_i$'s, respectively. There is an edge 314 from s to each $a_j \in A$ of capacity $p_j$ (the price of j) and an edge 316 from each $b_i \in B$ to t of capacity $e_i$ (the budget of i). Also, for each buyer i and good j, if $\alpha_i = u_{ij}/p_j$, then an edge 318 is placed from $a_j$ to $b_i$ of infinite capacity. This edge is called an equality edge. Notice that by this definition a bundle is optimal for buyer i with respect to the prices p if and only if its total price is equal to the budget of i, and it only contains goods that have an equality edge to $b_i$ in N(p).

The invariant of the DPSV algorithm can be stated as:

Invariant 1. The prices p are such that (s, A∪B∪t) is a min-cut in N(p).

For a price vector p and a subset S of goods, define $\Gamma_p(S)$ as the set of buyers i such that N(p) contains an edge from $a_j$ to $b_i$ for some $j \in S$. In other words, $\Gamma_p(S)$ is the set of buyers who are interested in at least one of the goods in S at price p. For any $S \subseteq A$, the money of S (denoted by $m_p(S)$) is the sum of the prices of the goods in S. Similarly, the money of a subset S of B (denoted by $m_e(S)$) is the sum of the budgets of the buyers in S.

By the above definition, it is straightforward to see that Invariant 1 is equivalent to the following:

Invariant 2. The prices p are such that for every $S \subseteq A$ it exists that $m_p(S) \le m_e(\Gamma_p(S))$.

Since the DPSV algorithm starts with an arbitrary price vector satisfying the invariant and only increases the prices until it reaches the equilibrium, therefore, it proves the following stronger statement. This observation is utilized in the analysis of one of the present invention's methods.

Theorem B: (Devanur et al.) Let $p^0$ be a price vector satisfying Invariant 1. Then there is a market-clearing price vector $p^*$ such that $p_j^* \ge p_j^0$ for every good j. Furthermore, $p^*$ can be computed in polynomial time.

In one instance of the present invention, a method is presented that computes an approximate market equilibrium in the setting of the Arrow-Debreu theorem (where there is no dichotomy between buyers and sellers) assuming that the utility functions are linear. This "approximately" overcomes a limitation of Devanur et al.

Since the market equilibrium problem is not an optimization problem, an approximate market equilibrium must be clarified. Deng et al. provides the following natural definition for the notion of approximate market equilibria:

Definition 1. An $\epsilon$-approximate equilibrium for a market is a price vector p* and a bundle $x^i$ for each agent i such that:

The market approximately clears, i.e., for every good j, $$(1-\varepsilon)\sum_{i=1}^{n} w_j^i \leq \sum_{i=1}^{n} x_j^i \leq \sum_{i=1}^{n} w_j^i.$$

For all i, the utility $$\sum_{j=1}^{m} u_{ij} x_j^i$$

of agent i is at least $(1-\epsilon)$ times the value of the optimum solution of the maximization equation (1).

The present invention provides at least two methods for computing market-clearing prices in a market with m types of goods and n agents, each having an initial endowment $w^i$ of goods and a linear utility function $$u_i(x) = \sum_{j=1}^{m} u_{ij} x_j.$$

The first method is similar in nature to the DPSV algorithm and is based on the approach of increasing the price of oversold items until an equilibrium is reached. The second method is a modification of the first method, proved through utilization of Theorem B that computes an approximate equilibrium in polynomial time.

Figure 4:
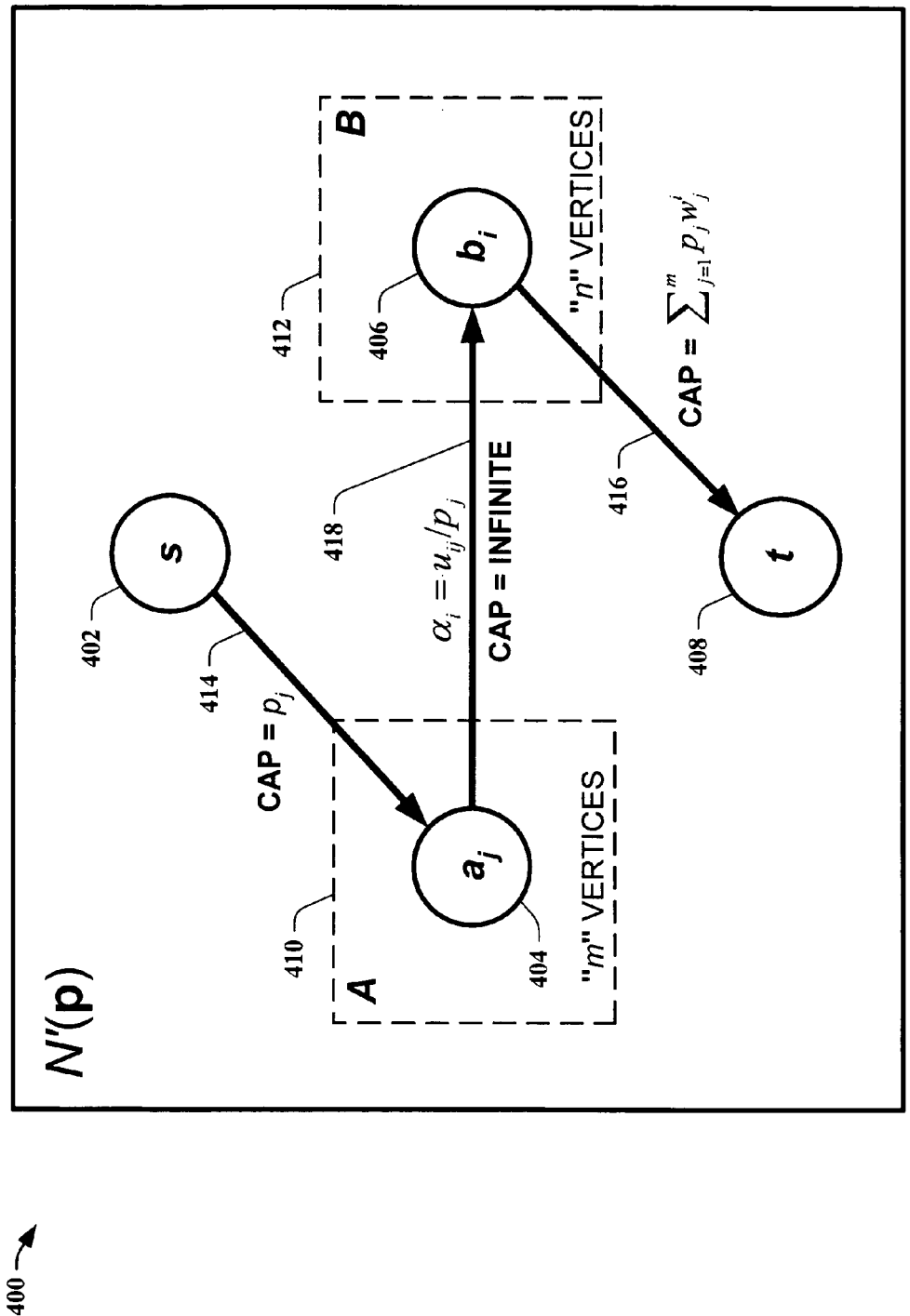
FIG. 4 is a graph illustrating an equality subgraph in accordance with an aspect of the present invention.

First, an equality subgraph 400 corresponding to the price vector p is defined. In FIG. 4, a graph illustrating the equality subgraph 400 in accordance with an aspect of the present invention is depicted. The definition is similar to the definition of the equality subgraph 300 in a dichotomous market presented supra (see also, FIG. 3), except here the budget of each buyer is a function of prices. More precisely, the equality subgraph 400 has m vertices in the first part A 410, n vertices in the second part B 412, equality edges 418 between A 410 and B 412 as defined supra, an edge 414 of capacity $p_j$ from a source s 402 to a vertex $a_j \in A$ 404, and an edge 416 of capacity $$\sum_{j=1}^{m} p_j w_j^i$$

from a vertex $b_i \in B$ 406 to a sink t 408. This equality subgraph 400 is denoted by N'(p) to avoid confusion with the equality subgraph 300 for dichotomous markets defined supra. The money of a set (denoted by $m_p(S)$) is defined as before, utilizing $$\sum_{j=1}^{m} p_j w_j^i$$

as the budget of buyer i.

For a set $S \subseteq A$, the deficiency of S (denoted by $def_p(S)$) is defined as $m_p(S) - m_p(\Gamma_p(S))$. The maximum deficiency of the price vector p (denoted by maxdef(p)) is the maximum value of $def_p(S)$ over all $S \subseteq A$. Thus:

Proposition 1. Assume p is a price vector and the budgets defined above are non-zero. Let $\{s\} \cup S \cup T$ be the s-side of the minimum st-cut in N'(p). Then $T = \Gamma_p(S)$ and the deficiency of the set S is equal to the maximum deficiency of p.

A set S with def (S)=maxdef(p) is called a maximally deficient set with respect to p. By the above fact, finding a maximally deficient set is equivalent to finding a minimum st-cut in N'(p).

Thus, the first method is as follows:

Method 1:
1. Start from an arbitrary price vector, say $p^0 = (1, 1, \ldots, 1)$.
2. Find the largest maximally deficient set S. Let D=def(S). If D=0 then stop.
3. Remove all equality edges between A\S and $\Gamma_p(S)$ from N'(p).
4. Increase the prices of the goods in A\S continuously and at the same rate (i.e., multiply these prices by a factor $\delta$ initially equal to 1 and increase $\delta$ continuously), until one of the following events occur:
   (a) A new equality edge is added to N'(p).
   (b) For a set $S' \not\subseteq S$, the deficiency of S' becomes equal to D.
   In either case, continue from Step 2. If none of the above events happens for any value of $\delta > 1$, then proceed to the next step.
5. Set the prices of the goods in S to zero, remove these goods from the set of goods, and start again from Step 2.

Step 4 in the above method can be implemented utilizing binary search over values of $\delta$ and/or utilizing a parametric network flow algorithm (see, Giorgio Gallo, Michael D. Grigoriadis, and Robert E. Tarjan; A Fast Parametric Maximum Flow Algorithm And Applications; *SIAM J. Comput.*, 18(1):30-55, 1989) to find the first event that occurs. Notice that Step 5 in the above method is only for taking care of (pathological) cases where in the equilibrium some of the prices are zero. If, for example, it is assumed that each agent has a non-zero utility for each good (i.e., $u_{ij} > 0$ for every i, j), then this step is not needed.

The premise of Method 1 is that it can be observed that if the maximum deficiency of the initial price vector $p^0$ is $D^0$, then the method never lets the maximum deficiency of p to increase beyond $D^0$. On the other hand, the method keeps increasing the total price of all goods. Therefore, the ratio of the maximum deficiency to the total prices will converge to zero. However, since in each step the prices might increase only slightly, the polynomial upper bound on the running time of Method 1 remains unknown. Instead, the method is modified to utilize the DPSV algorithm as a subroutine in each iteration. This enables a provable polynomial bound on the time it takes until the method reaches an approximate equilibrium.

Method 2:
1. Start from an arbitrary price vector, say p:=(1, 1, ..., 1).
2. Let D:=maxdef(p).
3. Construct an instance $M_p$ of a dichotomous market as follows: There are m types of goods and n+1 buyers. For i=1, ..., n, the utility of buyer i for the goods is the same as the utility of the corresponding agent in the original instance. Also, the budget of buyer i is $$e_i := \sum_{j=1}^{m} p_j w_j^i.$$

The (n+1)'th buyer has a budget of $e_{n+1} := D$ and its utility for good j is equal to $p_j$ (i.e., at price p, buyer n+1 is equally interested in all goods).
4. Run the DPSV algorithm on the instance $M_p$ starting from the price vector p. Let p' denote the output of this algorithm.
5. For every agent i, let $$e'_i := \sum_{j=1}^{m} p'_j w_j^i$$

be the budget of i with respect to p'. If $e_i'/e_i \leq 1+\epsilon$ for every agent i, then output p' and stop.
6. Let p:=p'. Go to Step 2.

Method 2 finds an $\epsilon$-approximate market equilibrium after, at most, polynomially many iterations.

One skilled in the art will appreciate that any algorithm/heuristic (e.g., primal-dual heuristics and/or convex programming algorithms) can be employed as a dichotomous market solution algorithm in place of the DPSV algorithm utilized supra to find equilibrium prices exactly and/or approximately on $M_p$, starting with price vector p and yielding p'.

Proof that Method 2 is correct (i.e., it computes an $\epsilon$-approximate market equilibrium) and terminates in polynomial time is now analyzed. Start with the following simple lemma, which shows that the price vector p satisfies Invariant 2 of the DPSV algorithm on the instance $M_p$, and, therefore, in Step 4 of Method 2, the DPSV algorithm runs with the initial price vector p.

Lemma 1: In Step 4 of Method 2, the price vector p satisfies Invariant 2 of the DPSV algorithm on the instance $M_p$.

Proof: It is enough to notice that by the definition, at the price p, the buyer n+1 is interested in all goods. Therefore, adding this buyer to the set of buyers decreases the deficiency of every set by the budget of buyer n+1, which is D. Therefore, after adding buyer n+1, the maximum deficiency is non-positive. Thus, p satisfies Invariant 2 on the instance $M_p$.

The following lemma shows that when Method 2 stops in Step 5, it must have found an $\epsilon$-approximate market equilibrium.

Lemma 2: Assume Method 2 terminates and outputs the price vector p*:=p'. Then there exist a bundle $x^i$ for each agent i such that:

The market clears, i.e., for every good j, $$\sum_{i=1}^{n} x_j^i = \sum_{i=1}^{n} w_j^i.$$

For all i, the utility $$\sum_{j=1}^{m} u_{ij} x_j^i$$

of agent i is at least $(1-\epsilon)$ times the value of the optimum solution of the maximization equation (1).

Therefore, the price vector p* together with the allocation x is an $\epsilon$-approximate market equilibrium.

Proof: Consider the instance $M_p$ constructed in the last iteration of the method and the equality subgraph N(p') for this instance. Find a maximum flow from s to t in this network and let $y_j^i$ denote the amount of flow from the $a_j$ to $b_i$ divided by $p_j'$. Thus, the total amount of flow entering the vertex $b_i$ is $\Sigma_j p_j' y_j^i$. Therefore, since p' is a market-clearing price in $M_p$, it follows that $\Sigma_j p_j' y_j^i = e_i$ for every i. By Theorem B, $p' \geq p$ and, therefore, $e_i' \geq e_i$ for every i. This shows that the allocation $y^i$ does not violate the budget constraint of agents. Also, by the termination condition of the method, it follows that $e_i \geq e_i'/(1+\epsilon) \geq (1-\epsilon)e_i'$. Thus, $\Sigma_j p_j' y_j^i \geq (1-\epsilon)e_i'$. That is, every agent uses at least a $(1-\epsilon)$ fraction of its budget. Since utility functions are linear, the solution of the maximization equation (1) is precisely the budget of agent i times the bang per buck for agent i. By the definition of the equality subgraph, the agent only buys goods that have the highest bang per buck for the agent. Therefore, the utility that agent i has for the allocation $y^i$ is at least a $(1-\epsilon)$ fraction of the agent's optimal bundle. Thus, the allocation $y^i$ satisfies the second condition.

In order to satisfy the first condition, the allocation $y^i$ is changed as follows: by the principle of conservation of money the total extra money that the agents have after buying the bundles $y^i$ is equal to the total price of the unsold goods. These goods are distributed among the agents arbitrarily, so that all goods are sold (i.e., the market clears). Let $x^i$'s denote the resulting allocations. Since by doing so, the utility of any agent is not increased, therefore, the allocation $x^i$ satisfies both conditions of the lemma.

Lemmas 1 and 2 together prove that Method 2 is correct. Now, it is shown that it terminates after polynomially many iterations. This is based on the fact that the price vector p in Method 2 satisfies the following invariant:

Lemma 3: Method 2 never increases the maximum deficiency of the price vector p.

Proof: The maximum deficiency of the price vector p' computed in Step 4 must be shown that it is not more than D (the maximum deficiency of p). Since the output p' of the DPSV algorithm must satisfy Invariant 2, $m_{p'}(S) \leq m_e(\Gamma'_p(S))$ for every set S of goods in $M_p$, where $\Gamma'_p(S)$ denotes the set of buyers that have an equality edge from the goods in S in the equality subgraph N(p') for the instance $M_p$ ($\Gamma'$ is utilized instead of $\Gamma$ to indicate the presence of the dummy buyer n+1) and $m_e(\Gamma'_{p'}(S))$ is computed utilizing the budgets $$e_i := \sum_{j=1}^{m} p_j w_j^i.$$

Therefore, if the buyer n+1 is removed from this instance, it leaves:

$$m_{p'}(S) - m_e(\Gamma'_{p'}(S)\setminus\{n+1\}) \leq D \qquad (Eq.\ 2)$$

for every set S.

On the other hand, by Lemma 2 and Theorem B, the price vector p' must satisfy $p_j' \geq p_j$ for every good j. Therefore:

$$m_e(\Gamma'_{p'}(S)\setminus\{n+1\}) = \sum_{i \in \Gamma'_{p'}(S)\setminus\{n+1\}} e_i \qquad (Eq.\ 3)$$

$$= \sum_{i \in \Gamma'_{p'}(S)} \sum_{j=1}^{m} p_j w_j^i$$

$$\leq \sum_{i \in \Gamma'_{p'}(S)} \sum_{j=1}^{m} p_j' w_j^i$$

$$= m_p'(\Gamma'_p(S)).$$

By Equations 2 and 3:

$$\text{def}_{p'}(S) = m_{p'}(S) - m_{p'}(\Gamma_{p'}(S)) \leq m_{p'}(S) - m_e(\Gamma'_{p'}(S)\setminus\{n+1\})$$
$$\leq D.$$

This completes the proof of the lemma.

The running time of Method 2 is analyzed as follows:

Lemma 4: Let $e_{min} := \min_i \Sigma_j w_j^i$ be the minimum budget $e_i$ in the first iteration of the algorithm. Then Method 2 terminates after at most $$O\left(\frac{n}{\varepsilon}\log\left(\frac{m}{\varepsilon e_{\min}}\right)\right)$$

iterations.

Proof: By Theorem B, $p' \geq p$ and, therefore, $e_i' \geq e_i$ for every i. On the other hand:

$$\sum_i e_i' = \sum_j p_j' = \sum_j p_j + D = \sum_i e_i + D.$$

Therefore, for every i, $$e_i' - e_i \leq D. \qquad (Eq.\ 4)$$

Let $D^0$ denote the maximum deficiency of the original price vector $(1, 1, \ldots, 1)$. By Lemma 3, the value of D in Method 2 is always less than or equal to $D^0$. Also, $D^0 \leq m$ by definition. Therefore, by Equation (4), $e_i' - e_i \leq m$. Thus, $$\frac{e_i'}{e_i} \leq 1 + \frac{m}{e_i}.$$

By the above inequality, the event $$\frac{e_i'}{e_i} > 1 + \varepsilon$$

can happen only if $$\frac{m}{e_i} > \varepsilon \text{ or } e_i < m/\varepsilon.$$

However, if this event happens in some iteration, then the value of $e_i$ in the next iteration (which is the same as the value of $e_i'$ in the current iteration) will grow by a factor of 1+ϵ. This means that after $$k = O\left(\frac{1}{\varepsilon}\log\left(\frac{m}{\varepsilon e_{\min}}\right)\right)$$

occurrences of the event $$\frac{e_i'}{e'} > 1 + \varepsilon,$$

the value of $e_i$ will be at least $$e_{\min}(1+\varepsilon)^k > \frac{m}{\varepsilon},$$

and, therefore, by the above observation, the event $$\frac{e_i'}{e'} > 1 + \varepsilon$$

cannot happen anymore. On the other hand, in every iteration in which the algorithm does not stop, this event must happen for at least one i. Thus, after at most $$O\left(\frac{n}{\varepsilon}\log\left(\frac{m}{\varepsilon e_{\min}}\right)\right)$$

iterations the algorithm stops.

Lemmas 2 and 4 together with the observation that log $(1/e_{min})$ is upper bounded by a polynomial in the size of input imply a polynomial-time method.

Theorem 1: For every ϵ>0, Method 2 computes an ϵ-approximate market equilibrium in time polynomial in 1/ϵ and the size of the input.

Note: Using Lemma 3 and the fact that in each iteration $\Sigma_j p_j' = \Sigma_j p_j + D$, it is straightforward to show the ratio of the maximum deficiency to the total price of goods (maxdef(p)/$\Sigma_j p_j$) in the r th iteration of Method 2 is at most 1/r. Therefore, if instead of the requirements of Definition 1, the relative maximum deficiency is only needed to be less than ϵ. Therefore, it is enough to run Method 2 for 1/ϵ iterations.

Thus, the present invention provides a polynomial-time approximation scheme for computing an approximate market equilibrium for a general market with linear utilities. Although a proof of obtaining a polynomial-time algorithm for computing the exact equilibrium has not been illustrated for Method 1, this instance of the present invention may provide such an algorithm. The proof is limited by the problem of analyzing the running time of Method 1. It has been conjectured that the basic DPSV algorithm runs in strongly polynomial time. A solution to this conjecture might be the first step toward analyzing the running time of Method 1.

Another instance of the present invention could also be applied to cases of strictly concave utility functions. In the Arrow-Debreu setting, strictly concave utility functions are more interesting than linear utility functions, since if the utilities are strictly concave, all optimal bundles are uniquely determined from the prices. Even for special classes of strictly concave utility functions, computing efficient market-clearing price is still a problem.

Yet another instance of the present invention could utilize unknown initial agent endowments and utilities. Thus, scenarios where the agents are allowed to behave strategically in announcing their initial endowment and/or utility function could be analyzed.

In view of the exemplary systems shown and described above, methodologies that may be implemented in accordance with the present invention will be better appreciated with reference to the flow charts of FIGS. 5-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Figure 5:
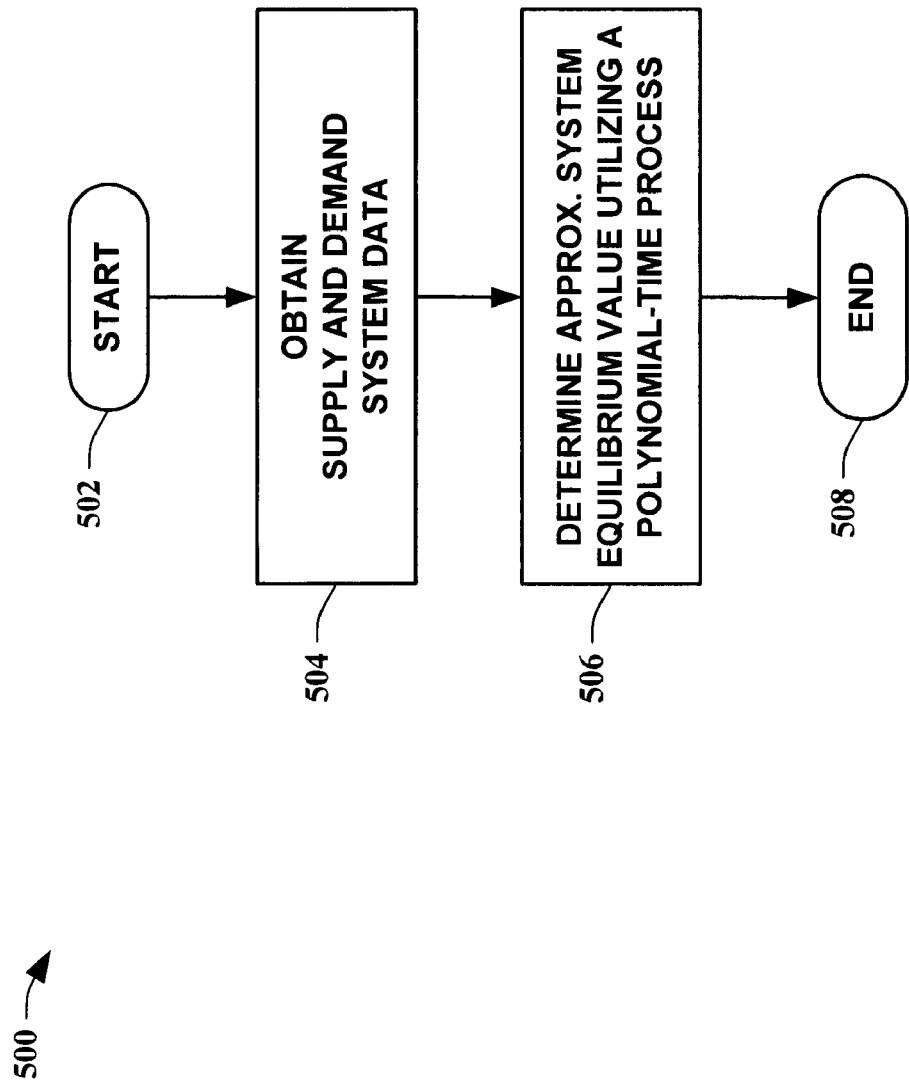
FIG. 5 is a flow diagram of a method of facilitating approximating an equilibrium value of a system in accordance with an aspect of the present invention.

In FIG. 5, a flow diagram of a method 500 of facilitating approximating an equilibrium value of a system in accordance with an aspect of the present invention is shown. The method 500 starts 502 by obtaining supply and demand system data 504. The system data can be for any system that yields a variable based upon a supply and demand mechanism. Thus, the system can be, for example, a market system and/or a computer network system and the like. For example, the market system variable can be a pricing equilibrium value and the computer network system variable can be based upon the supply and demand of network capacity. An approximate system equilibrium value is then determined utilizing a polynomial-time process 506, ending the flow 508. The approximate equilibrium value can be determined by utilizing, in one instance of the present invention, a polynomial-time method with a linear utility function to assess the supply and demand system data. The polynomial-time process generally demarcates at least a portion of the system data into supply system data and demand system data. This provides an accounting for an agent of the system being both a demander and a supplier within the same system. The demarcation process within the polynomial-time process provided by the present invention can also be utilized to simplify a system equilibrium method that employs a concave utility function.

Figure 6:
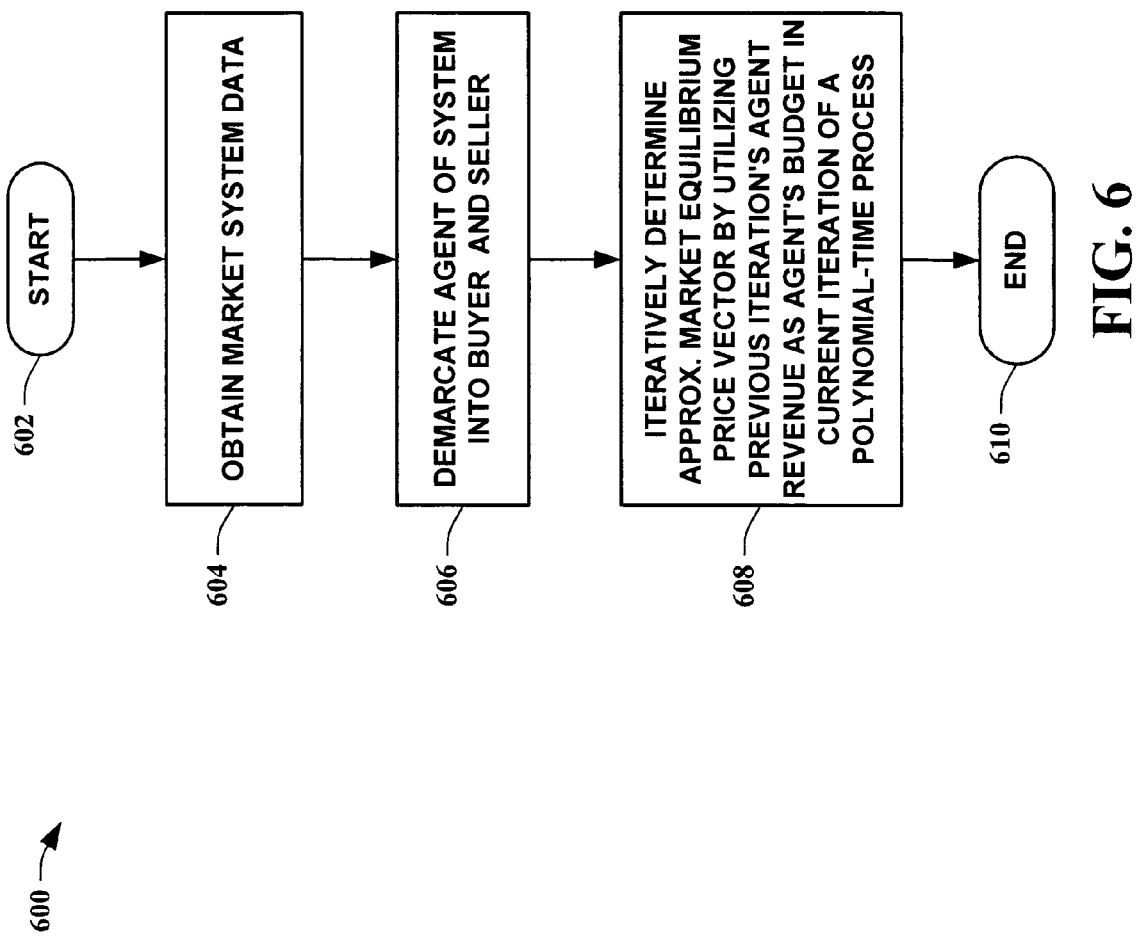
FIG. 6 is a flow diagram of a method of facilitating approximating an equilibrium price vector of a market system in accordance with an aspect of the present invention.

Referring to FIG. 6, a flow diagram of a method 600 of facilitating approximating an equilibrium price vector of a market system in accordance with an aspect of the present invention is illustrated. The method 600 starts 602 by obtaining market system data 604. A portion of the market system data for an agent of the market system is demarcated into buyer data and seller data for that agent 606. This demarcation method of the present invention can be utilized with linear and/or concave utility functions of a market equilibrium determination method to simplify the processing. A previous iteration's agent revenue data is then utilized as the agent's budget for the current iteration to iteratively determine an approximate market equilibrium price vector in a polynomial-time process 608, ending the flow 610. The polynomial-time process leverages the dichotomous system via iterative analysis to provide a polynomial-time solution. Thus, agents of a market system are utilized both as suppliers and demanders to increase accuracy of the solution. A determination to output the approximate market equilibrium price vector can be based on, for example, number of iterations, a predetermined threshold error value, and/or a dynamic control process, and the like. In other instances of the present invention, a "dummy" agent is provided to facilitate in initializing the polynomial-time process. The dummy buyer is employed to purchase residual goods in order to facilitate initializing the present invention. This permits the initial market system to be "sold out" completely even when an initial price is substantially off from the desired equilibrium price.

One skilled in the art will appreciate that the present invention's methods can be utilized in totality and/or in portions to facilitate determining market equilibria. Thus, demarcating agent data and/or iteratively processing demarcated agent data can be utilized to reach a solution in linear and/or concave-based system processing within the scope of the present invention.

Figure 7:
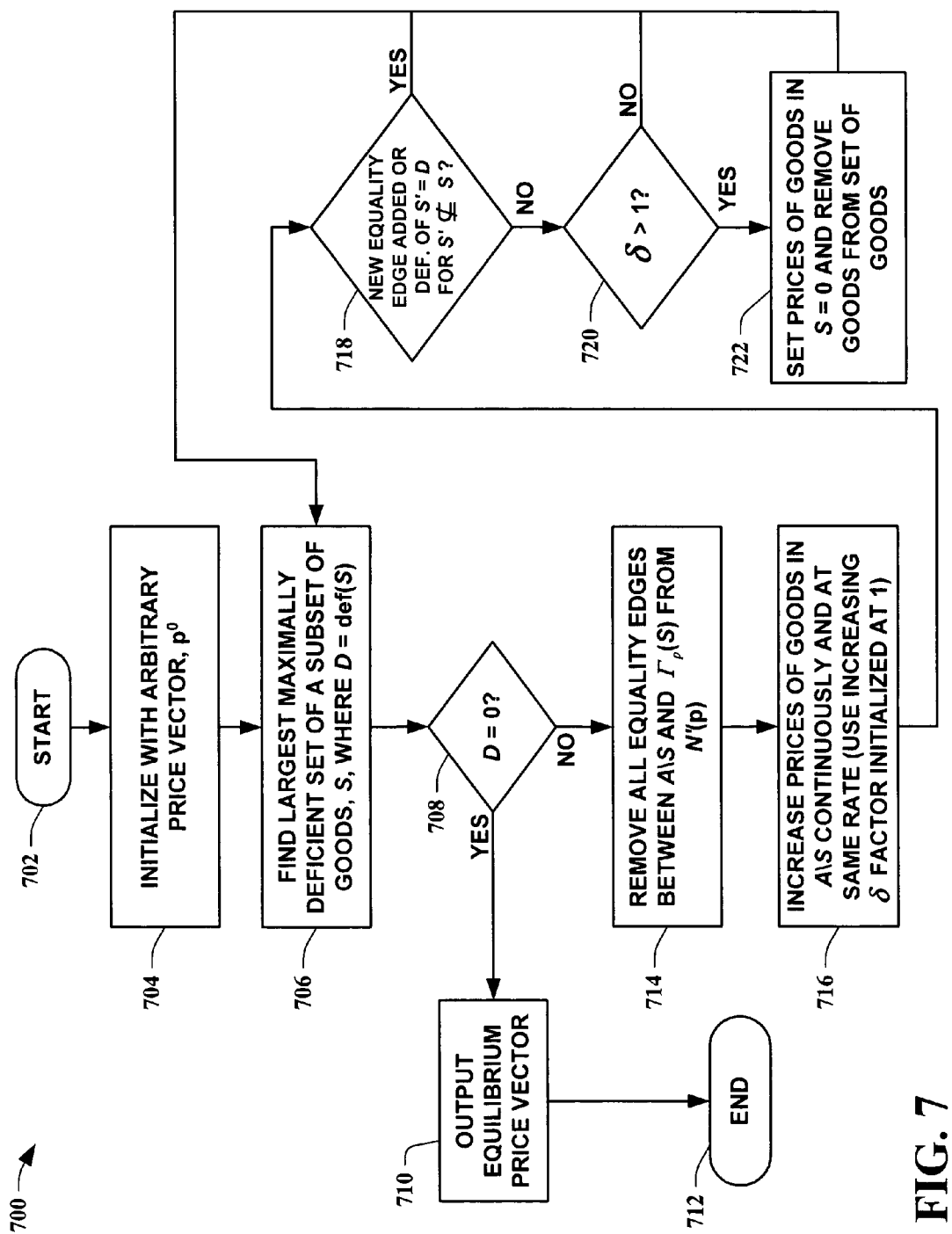
FIG. 7 is another flow diagram of a method of facilitating approximating an equilibrium price vector of a market system in accordance with an aspect of the present invention.

Looking at FIG. 7, another flow diagram of a method 700 of facilitating approximating an equilibrium price vector of a market system in accordance with an aspect of the present invention is depicted. The method 700 starts 702 by initializing with an arbitrary price vector, $p^0$ for an equality subgraph $N'(p)$ 704. The largest maximally deficient set of a subset of goods, S, is found and denoted as $D=def(S)$ 706. A determination is then made as to whether D is equal to zero 708. If D=0, the current price vector is output as an equilibrium price vector 710, ending the flow 712. If not, any equality edges from between $A\backslash S$ and $\Gamma_p(S)$ are removed from $N'(p)$ 714. Prices of goods in $A\backslash S$ are then continuously increased each iteration and at the same rate (e.g., utilizing a $\delta$ factor initialized at one and multiplying it with the price) 716. This can be implemented utilizing binary search over values of $\delta$ and/or utilizing a parametric network flow algorithm to find the first event that occurs. A determination is then made as to whether the increase has produced a new equality edge or whether a deficiency of $S'=D$, where $S' \not\subseteq S$ 718. If either of these events occurs, a new iteration is started by finding the largest maximally deficient set of S 706. If neither event occurs, a determination is made as to whether the $\delta$ factor has been incremented beyond the first initial value of one 720. If not, a new iteration is started beginning with finding the largest maximally deficient set of S 706. However, if the $\delta$ factor is greater than one, prices of goods in S are set equal to zero and removed from the set of goods 722. This step in the present invention is only for taking care of (pathological) cases where in the equilibrium some of the prices are zero. If, for example, it is assumed that each agent has a non-zero utility for each good (i.e., $u_{ij}>0$ for every i, j), then this step is not required.

The method 700 then continues back for another iteration by finding the largest maximally deficient set of S 706. Essentially, if the maximum deficiency of the initial price vector $p^0$ is $D^0$, then the method 700 never lets the maximum deficiency of p to increase beyond $D^0$. On the other hand, the method 700 keeps increasing the total price of all goods. Therefore, the ratio of the maximum deficiency to the total prices will converge to zero.

Figure 8:
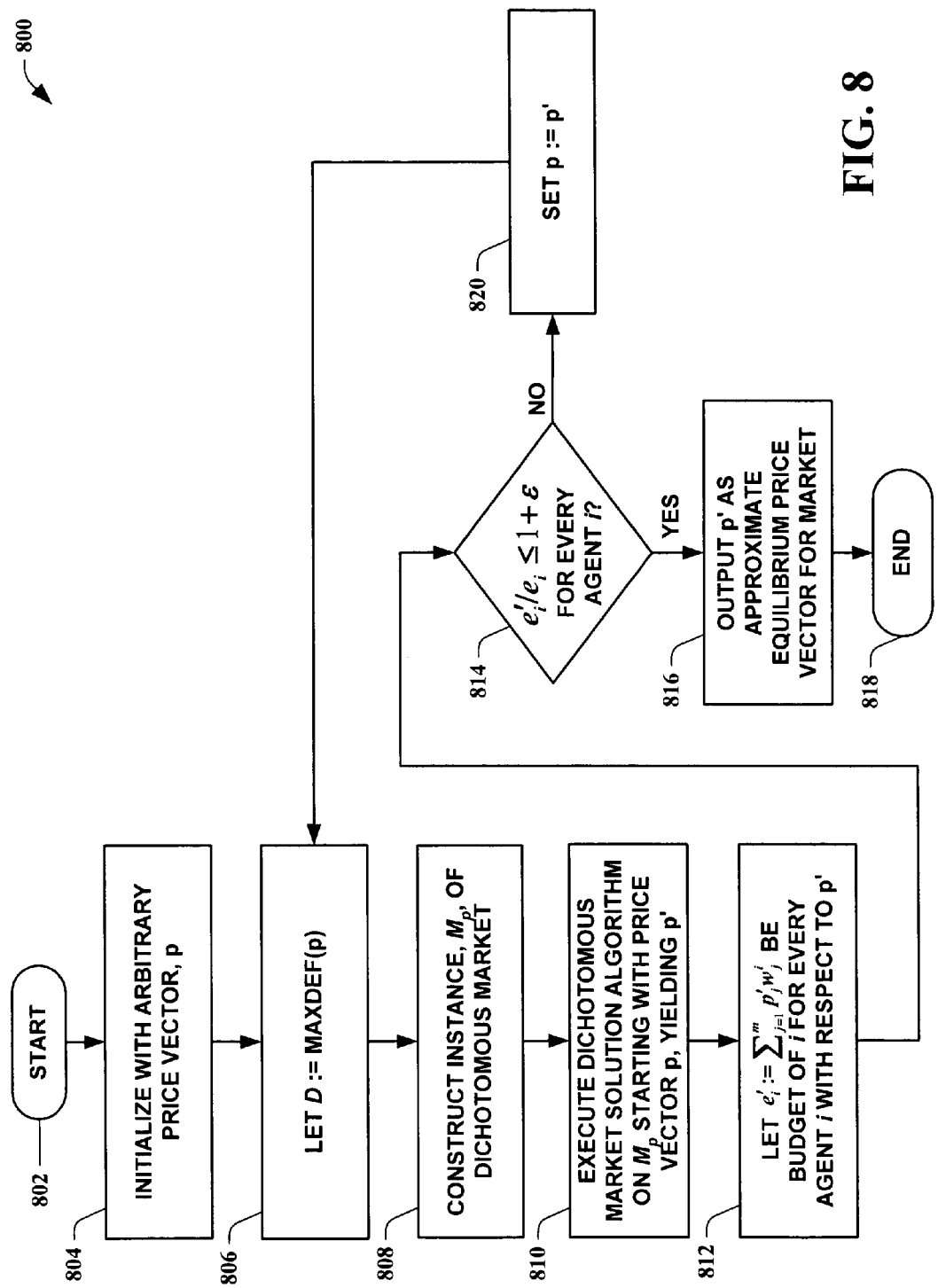
FIG. 8 is yet another flow diagram of a method of facilitating approximating an equilibrium price vector of a market system in accordance with an aspect of the present invention.

Turning to FIG. 8, yet another flow diagram of a method 800 of facilitating approximating an equilibrium price vector of a market system in accordance with an aspect of the present invention is shown. The method 800 starts 802 by initializing with an arbitrary price vector, p 804. Then let D:=maxdef(p) 806. An instance, $M_p$, of a dichotomous market (i.e., demarcated buyers and sellers) is constructed 808. $M_p$ is built on m types of goods and n+1 buyers. For i=1, . . . , n, the utility of buyer i for the goods is the same as the utility of the corresponding agent in the original instance. Also, the budget of buyer i is $$e_i := \sum_{j=1}^{m} p_j w_j^i.$$

The (n+1)'th buyer has a budget of $e_{n+1} := D$ and its utility for good j is equal to $p_j$ (i.e., at price p, buyer n+1 is equally interested in all goods). A dichotomous market solution algorithm is then executed on the dichotomous market instance, $M_p$, with a starting price vector, p, yielding an output result of price vector p' 810. Any algorithm/heuristic (e.g., primal-dual heuristics and/or convex programming algorithms) can be employed as the dichotomous market solution algorithm to find equilibrium prices exactly and/or approximately on $M_p$, starting with price vector p and yielding p'. Then, for every agent i, let $$e_i' := \sum_{j=1}^{m} p_j' w_j^i$$

be the budget of i with respect to p' 812. A determination is then made as to whether every agent i satisfies $e_i'/e_i \leq 1+\epsilon$ 814. If every agent i meets this criterion, p' is output as an approximate equilibrium price vector for the market 816, ending the flow 818. However, if this criterion is not met, set p:=p' 820 and begin a new iteration at letting D:=maxdef(p) 806. By utilizing the dichotomous market solution algorithm as a subroutine in each iteration, the present invention provides an $\epsilon$-approximate market equilibrium after, at most, polynomially many iterations.

Figure 9:
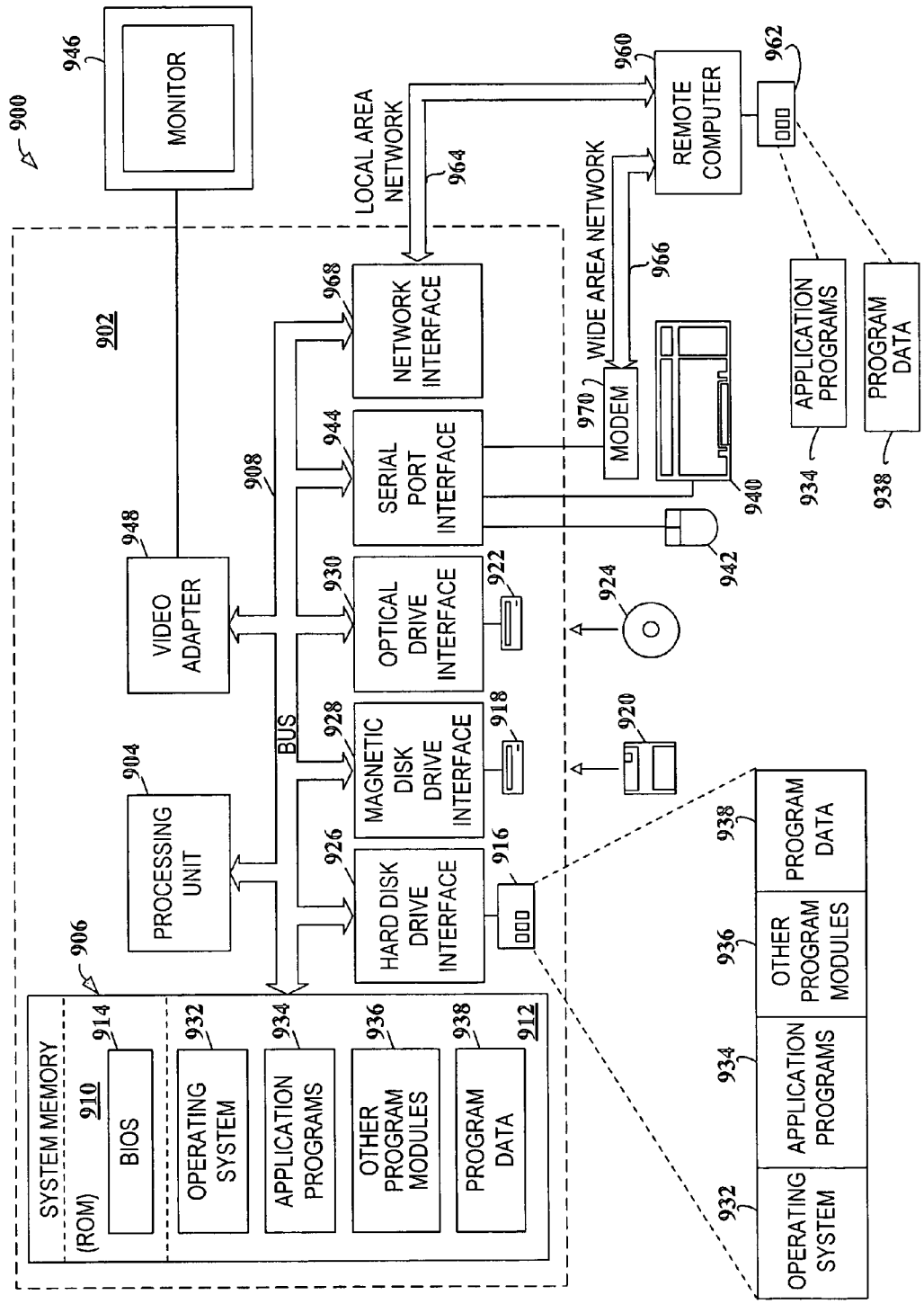
FIG. 9 illustrates an example operating environment in which the present invention can function.

In order to provide additional context for implementing various aspects of the present invention, FIG. 9 and the following discussion is intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the present invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include an equilibrium value determination scheme in accordance with an aspect of the present invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although, for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary, and other means (e.g., wired or wireless) of establishing a communications link between the computers 902 and 960 can be used when carrying out an aspect of the present invention.

In accordance with the practices of persons skilled in the art of computer programming, the present invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
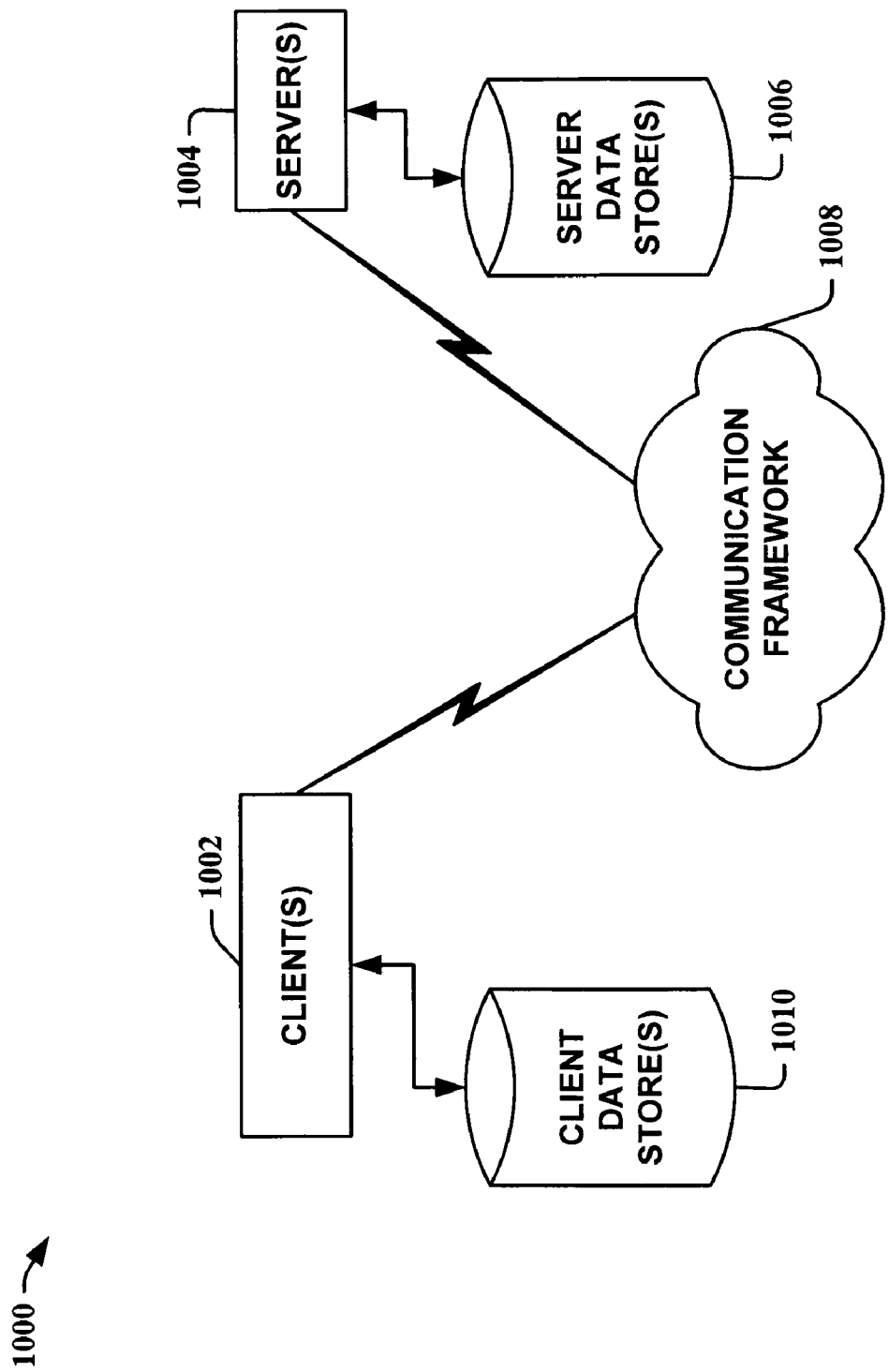
FIG. 10 illustrates another example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The server(s) 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In one instance of the present invention, a data packet transmitted between two or more computer components that facilitates equilibrium value determination is comprised of, at least in part, information relating to an equilibrium value determination system that utilizes, at least in part, demarcation of agent related data into buyer data and seller data to employ in a polynomial-time approximation method that generates an approximated equilibrium value for the system.

It is to be appreciated that the systems and/or methods of the present invention can be utilized in equilibrium value determination facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable medium having computer-readable instructions embedded therein which, when executed by a computer, cause the computer to implement a method for facilitating determination of equilibrium values for a market system, the method for facilitating determination of equilibrium values for the market system comprising:

receiving a number of types of goods m, a number of buyers (n+1), an initial amount of each good that each buyer possesses, and a utility function for each of buyers i=1, . . . , n, for the market system;

applying a polynomial-time approximation method to the received data to generate an approximate equilibrium price vector for the market system, the polynomial-time approximation method comprising:
  initializing with an arbitrary first price vector p;
  setting a variable, D, to represent a maximum deficiency for the first price vector p;
  constructing an instance, $M_p$, of the market system, wherein constructing the instance, $M_p$, of the market system comprises:
    providing m types of goods and (n+1) buyers;
    setting, for i=1, ..., n, a utility of buyer i for the goods as to be calculated from the corresponding utility function;
    establishing the budget of buyers i=1, ..., n, according to:

$$e_1 := \sum_{j=1}^{m} p_j w_j^i, \ e_i := \sum_{j=1}^{m} p_j w_j^i,$$

wherein $e_i$ is the budget of buyer i, $p_j$ is the price of good j in the first price vector, and $w_j^i$ is equal to an initial amount of good j that buyer i possesses;
  setting, for i=(n+1), a utility of buyer i for each of goods j=1, ..., m, as equal to $p_j$; and
  establishing the budget of buyer i=(n+1) as $e_{(n+1)}$:=D;
executing a DPSV algorithm on the instance, $M_p$, starting from the first price vector p and increasing prices until equilibrium is reached, and outputting a second price vector (p') via execution of the DPSV algorithm;
setting a budget $e_i'$ for each buyer i with respect to the second price vector (p') according to:

$$e_i' := \sum_{j=1}^{m} p_j' w_j^i;$$

determining if a budget ratio ($e_i'/e_i$) for each buyer i satisfies a budget ratio constraint of:

$$e_i'/e_i \le 1 + \varepsilon,$$

wherein $\varepsilon$ represents a desired amount of approximation;
identifying the second price vector (p') when the budget ratio constraint is satisfied for every buyer i as the approximate equilibrium price vector for the market system; and
iterating the polynomial-time approximation method with the first price vector p set equal to the second price vector (p'), instead of an arbitrary price vector, when the budget ratio constraint is unsatisfied, until the budget ratio constraint is satisfied;
outputting the approximate equilibrium price vector to a computer monitor display; and
setting prices based on the approximate equilibrium price vector.

2. The computer-readable medium of claim 1, wherein the approximate equilibrium price vector comprises an approximate equilibrium price vector, p*, that produces, in conjunction with a bundle of goods for each buyer i, an $\varepsilon$-approximate equilibrium for the market system such that:
for every good j:

$$(1-\varepsilon) \sum_{i=1}^{n} w_j^i \le \sum_{i=1}^{n} x_j^i \le \sum_{i=1}^{n} w_j^i;$$

wherein $x_j^i$ is the number of good j in the bundle of goods of buyer i; and
for all i, a utility, $$\sum_{j=1}^{m} u_{ij} x_j^i,$$

of buyer i is equal to or greater than $(1-\varepsilon)$ times a value of an optimum solution of a maximization of the utility function for the buyer i subject to:

$$\sum_{j=1}^{m} p_j^* x_j \le \sum_{j=1}^{m} p_j^* w_j^i; \quad \text{(Eq. 1)}$$

wherein m represents the number of types of goods and $w_j^i$ indicates the initial amount of good j that buyer i possesses.

3. The computer-readable medium of claim 1, wherein the polynomial-time approximation method comprises an iterative method that utilizes, at least in part, revenue generated in a previous iteration for a specific buyer as a budget for the specific buyer in a current iteration.

4. The computer-readable medium of claim 3, wherein the iterative method further utilizes a dummy buyer to account for residual goods.

5. The computer-readable medium of claim 1, wherein the polynomial-time approximation method comprises, at least in part, a linear utility function for at least one buyer.

6. The computer-readable medium of claim 1, wherein the polynomial-time approximation method yields an exact equilibrium price for the market system.

7. A computer-implemented method for facilitating determination of equilibrium values for a market system, comprising:
  receiving, by a computing system, a number of types of goods m, a number of buyers (n+1), an initial amount of each good that each buyer possesses, and a utility function for each of buyers i=1, ..., n, for the market system;
  applying, by the computing system, a polynomial-time approximation method to the received data to generate an approximate equilibrium price vector for the market system, the polynomial-time approximation method comprising:
    initializing with an arbitrary first price vector p;
    setting a variable, D, to represent a maximum deficiency for the first price vector p;
    constructing an instance, $M_p$, of the market system, wherein constructing the instance, $M_p$, of the market system comprises:
      providing m types of goods and (n+1) buyers;
      setting, for i=1, ..., n, a utility of buyer i for the goods as to be calculated from the corresponding utility function;

establishing the budget of buyers i=

$$e'_i := \sum_{j=1}^{m} p'_j w^j_i;$$

1, ..., n, according to:

$$e_i := \sum_{j=1}^{m} p_j w^j_i,$$

wherein $e_i$ is the budget of buyer i, $p_j$ is the price of good j in the first price vector, and $w^j_i$ is equal to an initial amount of good j that buyer i possesses;

setting, for i=(n+1), a utility of buyer i for each of goods j=1, ..., m, as equal to $p_j$; and establishing the budget of buyer i=(n+1) as $e_{(n+1)}$:=D;

executing a DPSV algorithm on the instance, $M_p$, starting from the first price vector p and increasing prices until equilibrium is reached, and outputting a second price vector (p');

setting a budget $e_i'$ for each buyer i with respect to the second price vector (p') according to:

$$e'_i := \sum_{j=1}^{m} p'_j w^j_i;$$

determining if a budget ratio ($e_i'/e_i$) for each buyer i satisfies a budget ratio constraint of:

$$e'_i / e_i \le 1 + \varepsilon,$$

wherein $\varepsilon$ represents a desired amount of approximation;

identifying the second price vector (p') when the budget ratio constraint is satisfied for every buyer i as the approximate equilibrium price vector for the market system; and iterating the polynomial-time approximation method with the first price vector p set equal to the second price vector (p'), instead of an arbitrary price vector, when the budget ratio constraint is unsatisfied, until the budget ratio constraint is satisfied;

outputting the approximate equilibrium price vector to a computer monitor display; and setting prices based on the approximate equilibrium price vector.

8. The computer-implemented method for facilitating determination of equilibrium values for the market system of claim 7, wherein the approximate equilibrium price vector comprises an approximate equilibrium price vector, p*, that produces, in conjunction with a bundle of goods for each buyer i, an $\varepsilon$-approximate equilibrium for the market system such that:

for every good j:

$$(1-\varepsilon)\sum_{i=1}^{n} w^j_i \le \sum_{i=1}^{n} x^j_i \le \sum_{i=1}^{n} w^j_i;$$

wherein $x_j^i$ is the number of good j in the bundle of goods of buyer i; and for all i, a utility, $\Sigma_{j=1}^{m} u_{ij} x_j^i$, of buyer i is equal to or greater than $(1-\varepsilon)$ times a value of an optimum solution of a maximization of the utility function for the buyer i subject to:

$$\sum_{j=1}^{m} p^*_j x^j_i \le \sum_{j=1}^{m} p^*_j w^j_i;$$

wherein m represents the number of types of goods and $w_j^i$ indicates the initial amount of good j that buyer i possesses.

9. The computer-implemented method for facilitating determination of equilibrium values for the market system of claim 7, wherein the polynomial-time approximation method comprises an iterative method that utilizes, at least in part, revenue generated in a previous iteration for a specific buyer as a budget for the specific buyer in a current iteration.

10. The computer-implemented method for facilitating determination of equilibrium values for the market system of claim 9, wherein the iterative method further utilizes a dummy buyer to account for residual goods.

11. The computer-implemented method for facilitating determination of equilibrium values for the market system of claim 7, wherein the polynomial-time approximation method yields an exact equilibrium price for the market system.

12. A computer system that facilitates determination of equilibrium values for a market system, comprising:

a processor; and a memory connected to the processor;

wherein the processor and the memory perform the steps of:

receiving a number of types of goods m, a number of buyers (n+1), an initial amount of each good that each buyer possesses, and a utility function for each of buyers i=1, ..., n, for the market system;

applying a polynomial-time approximation method to the received data to generate an approximate equilibrium price vector for the market system, the polynomial-time approximation method comprising:

initializing with an arbitrary first price vector p;

setting a variable, D, to represent a maximum deficiency for the first price vector p;

constructing an instance, $M_p$, of the market system, wherein constructing the instance, $M_p$, of the market system comprises:

providing m types of goods and (n+1) buyers;

setting, for i=1, ..., n, a utility of buyer i for the goods as to be calculated from the corresponding utility function;

establishing the budget of buyers i=1, ..., n, according to:

$$e_i := \sum_{j=1}^{m} p_j w_j^i, \; e_i := \sum_{j=1}^{m} p_j w_j^i,$$

wherein $e_i$ is the budget of buyer i, $p_j$ is the price of good j in the first price vector, and $W_j^i$ is equal to an initial amount of good j that buyer i possesses;

setting, for i=(n+1), a utility of buyer i for each of goods j=1, ..., m, as equal to $p_j$; and establishing the budget of buyer i=(n+1) as $e_{(n+1)}$:=D;

executing a DPSV algorithm on the instance, $M_p$, starting from the first price vector p and increasing prices until equilibrium is reached, and outputting a second price vector (p');

setting a budget $e_i'$ for each buyer i with respect to the second price vector (p') according to:

$$e_i' := \sum_{j=1}^{m} p_j' w_j^i;$$

determining if a budget ratio ($e_i'/e_i$) for each buyer i satisfies a budget ratio constraint of:

$$e_i'/e_i \leq 1 + \varepsilon,$$

wherein $\varepsilon$ represents a desired amount of approximation;

identifying the second price vector (p') when the budget ratio constraint is satisfied for every buyer i as the approximate equilibrium price vector for the market system; and iterating the polynomial-time approximation method with the first price vector p set equal to the second price vector (p'), instead of an arbitrary price vector, when the budget ratio constraint is unsatisfied, until the budget ratio constraint is satisfied;

outputting the approximate equilibrium price vector to a computer monitor display; and setting prices based on the approximate equilibrium price vector.

13. The computer system of claim 12, wherein the polynomial-time approximation method comprises an iterative method that utilizes, at least in part, revenue generated in a previous iteration for a specific buyer as a budget for the specific buyer in a current iteration.

14. The computer system of claim 12, wherein the polynomial-time approximation method yields an exact equilibrium price for the market system.

* * * * *